United States Patent
Bader

(10) Patent No.: US 7,431,137 B2
(45) Date of Patent: Oct. 7, 2008

(54) SYNCHRONIZER FOR A MANUAL TRANSMISSION ESPECIALLY FOR A MOTOR VEHICLE

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 304 days.

(21) Appl. No.: 11/358,439

(22) Filed: Feb. 21, 2006

(65) Prior Publication Data

US 2006/0185958 A1    Aug. 24, 2006

(30) Foreign Application Priority Data

Feb. 22, 2005   (DE) .................... 10 2005 007 957

(51) Int. Cl.
   *F16D 23/06*   (2006.01)
(52) U.S. Cl. .............. 192/53.32; 192/53.331; 74/339
(58) Field of Classification Search .......... 192/53.32, 192/53.33, 53.331, 53.332, 53.4
   See application file for complete search history.

(56) References Cited

U.S. PATENT DOCUMENTS

| 2,035,507 | A | * | 3/1936 | Robbins ................. | 192/53.33 |
| 2,993,579 | A | * | 7/1961 | Altmann .................. | 192/53.31 |
| 3,286,801 | A | * | 11/1966 | Wojcikowski .......... | 192/53.331 |
| 3,529,484 | A | * | 9/1970 | Tomita et al. .............. | 74/339 |
| 4,349,090 | A | * | 9/1982 | Griesser ................. | 192/53.32 |
| 5,092,438 | A | | 3/1992 | Reynolds et al. | |
| 5,769,198 | A | | 6/1998 | Gluys et al. | |
| 5,913,936 | A | | 6/1999 | Kruse et al. | |

FOREIGN PATENT DOCUMENTS

| DE | 25 38 782 | 3/1977 |
| EP | 0 492 836 A1 | 7/1992 |
| EP | 0 899 473 A1 | 3/1999 |
| EP | 0 933 548 A2 | 8/1999 |
| FR | 2 556 437 | 6/1985 |
| GB | 464 102 | 4/1937 |

OTHER PUBLICATIONS

ZF Friedrichshafen AG so called single-cone synchronizer identified as ZF-B.
ZF Friedrichshafen AG so called double-cone ring synchronizer identified as ZF-D.
Lechner, B. G. and H. Naunheimer, Schalterinrichtungen, Auslegung und Gestaltung von Synchronisierungen., 1994, Springer-Verlag, pp. 226-262.

* cited by examiner

*Primary Examiner*—Rodney H Bonck
(74) *Attorney, Agent, or Firm*—Davis Bujold & Daniels, P.L.L.C.

(57) ABSTRACT

A synchronizer for a manual transmission with a first and second idler gears rotatably mounted on a transmission shaft with a synchronizer sleeve non-rotatably mounted on the transmission shaft such that it can shift axially. The sleeve can be coupled to the first or second idler gear and comprises a shifting flange with through openings arranged around its periphery. A first and second synchronizer ring are separated by way of locking pins around the periphery, which can be inserted through the openings. At least one of the two synchronizer rings has an outer cone and an inner cone (double cone), that the double cone can be placed in non-positive contact simultaneously with an outer coupling ring that has an inner cone and an inner coupling ring that has an outer cone, and that the two coupling rings can be positively connected to the adjacent idler gear and axially supported against it.

12 Claims, 1 Drawing Sheet

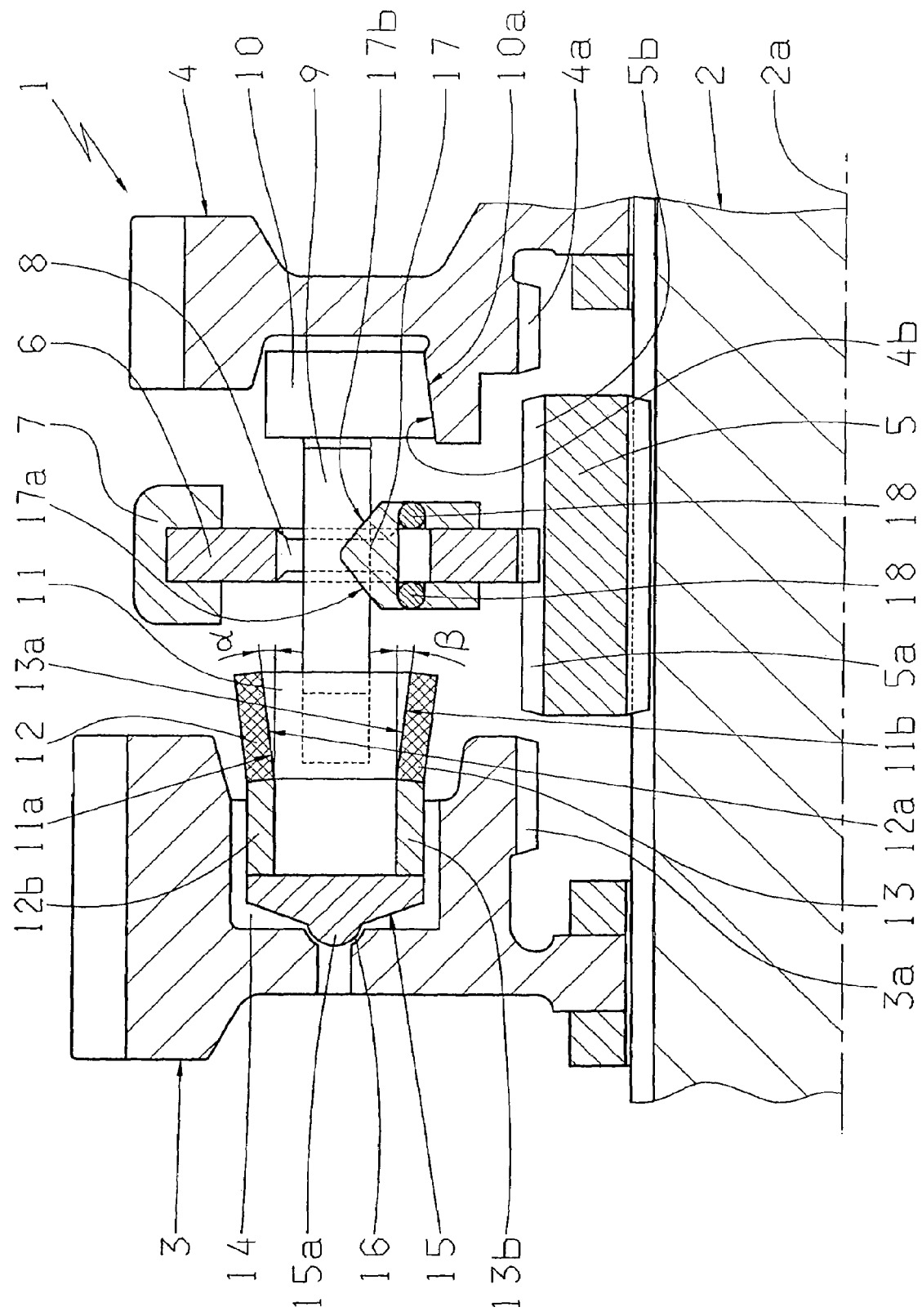

SYNCHRONIZER FOR A MANUAL TRANSMISSION ESPECIALLY FOR A MOTOR VEHICLE

This application claims priority from German Application Serial No. 10 2005 007 957.1 filed Feb. 22, 2005.

FIELD OF THE INVENTION

The invention relates to a synchronizer for a manual transmission.

BACKGROUND OF THE INVENTION

Synchronizers for motor vehicle manual transmissions are known in various forms, both with and without locking devices. With the so-called single-cone synchronizer (known under the Applicant's designation ZF-B), a coupling element comprises a friction cone, which is placed in contact with an opposite cone on a synchronizer ring in order to balance the different speeds of the transmission shaft and the idler gear to be engaged. While the single-cone synchronizer comprises only a single friction pair, the known double-cone synchronizer (known under the Applicant's designation ZF-D) comprises a double-cone ring with tapered surfaces arranged parallel relative to one another. Thus two friction pairs are used, which serves to reduce the shifting force and increase the friction momentum capacity. The drawback of the double-cone synchronizer is that it requires narrower manufacturing tolerances and thus leads to higher manufacturing costs.

Also known is the so-called locking pin synchronizer, in which two synchronizer rings, each with one inner and one outer cone, mesh with idler gears in order to balance the speeds. The synchronizer rings are equipped with locking pins around their outer circumference, which are held in borings in a synchronizer sleeve. Further details on these known synchronizers may be found in the technical literature, for example, G. Lechner and H. Naunheimer, Fahrzeuggetriebe [Motor Vehicle Transmissions], 1994, Springer Publishers, pp. 225-260.

A further locking pin synchronizer was disclosed in EP 0 492 836 B1, wherein the synchronizer rings each comprise an outer cone, which functions in a non-positive connection with an opposite cone on the idler gears. One disadvantage of this known design is an increased shifting force and a reduced amount of transmittable torque.

The object of the present invention is to achieve a reduced shifting force with increased friction momentum in a synchronizer of the type described above without increasing manufacturing costs.

SUMMARY OF THE INVENTION

According to the invention, at least one of the two synchronizer rings comprises a double cone and can be placed in contact with an inner and an outer coupling ring, each of which comprises a corresponding opposite cone. With the double cone, a reduced shifting force and an increased friction momentum can be achieved as a result of the increased number of friction surfaces.

In one advantageous embodiment of the invention, the conical surfaces of the double cone have opposite degrees of taper. This results in the advantage that an even level of pressure between the inner and outer cones is produced.

In another advantageous embodiment of the invention, the coupling rings are designed as plate components, which are equipped on the end face rim with panels that engage in corresponding pockets in the allocated idler gear and thus are held in place via a positive connection. The benefit of lower production costs is achieved, because it is not necessary for the coupling rings to be manufactured via cutting.

In a further advantageous embodiment of the invention, the two coupling rings are supported on a rocker which, in turn, is axially supported relative to the idler gear by way of a pivot. In this manner, the advantage is achieved that the outer and inner coupling rings can be moved axially and relative to one another so that the double cone of the synchronizer ring can lie evenly on the inner and the outer cone of the coupling rings. Manufacturing tolerances are thereby balanced and an effective transmission of torque is achieved.

In another advantageous embodiment of the invention, locking elements are arranged in openings through the shifting flange, which elements are inserted into the openings as "sliders" and equipped with inclined locking surfaces. The locking pins have notches with corresponding inclined surfaces, which lie against the locking surfaces. In this manner, a solution is achieved that is cost-effective in terms of manufacturing technology.

BRIEF DESCRIPTION OF THE DRAWING

The invention will now be described, by way of example, with reference to the accompanying drawing in which:

The sole FIGURE shows a synchronizer 1 for a manual transmission of a motor vehicle, not shown in its entirety.

DETAILED DESCRIPTION OF THE INVENTION

A first idler gear 3 and a second idler gear 4 are rotatably mounted and axially affixed on a transmission shaft 2. The idler gears 3, 4, which are designed as toothed gears, are in toothed engagement with other toothed gears (not illustrated here) to allow the engagement of various gears. Each of the idler gears 3, 4 has a claw or inner gearing 3a, 4a. Between the two idler gears 3, 4, a synchronizer sleeve 5 is arranged so that it can shift axially on the transmission shaft 2, but is non-rotatably attached to the transmission shaft 2, wherein said sleeve 5 is equipped with a set of outer gearing 5a, 5b which, with an axial shifting of the synchronizer sleeve 5, can engage either with the inner gearing 3a of the idler gear 3 or with the inner gearing 4a of the idler gear 4, thus establishing a coupling of either the idler gear 3 or the idler gear 4 with the transmission shaft 2. At the center of the synchronizer sleeve 5, a shifting flange 6 in the shape of a washer is attached, i.e., is fastened axially and tangentially. The shifting flange 6 is encompassed on its outer periphery by a sliding U-shaped shifting element 7 (slider), which is mounted in a fixed position in the transmission and effects an axial shifting of the synchronizer sleeve 5 for the purpose of shifting the gears. Preferably six through openings 8 are arranged in the shifting flange 6, distributed around its periphery, into which locking pins 9 can be inserted. The locking pins 9 are alternately connected to a conventional synchronizer ring 10 positioned on the right in the drawing and a synchronizer ring 11 according to the invention, for example, they are cast in. The conventional synchronizer ring 10 comprises an inner cone 10a (single cone), which forms a friction pair with an outer cone 4b of the idler gear 4. The synchronizer ring 11 comprises a double cone, according to the invention, with an outer cone 11a and an inner cone 11b. The outer cone 11a has a taper angle $\alpha$ and the inner cone 11b has a taper angle $\beta$, which is oriented opposite the taper angle $\alpha$. The profile of the synchronizer ring 11 (shown in the drawing) thus forms an acute-angled trapezoid, i.e., with base angles 90-$\alpha$ or 90-$\beta$. The taper angles α and β are preferably equal in size. The outer cone 11a and the inner cone 11b of the synchronizer ring 11 are in non-positive contact with an outer coupling ring 12 and an inner coupling ring 13, each of which has an opposite cone 12a or 13a. The outer coupling ring 12 is equipped on its end face, i.e., on the side that faces the idler gear 3, with panels 12b—arranged distributed around its outer circumference, and the inner coupling ring 13 is equipped with analogous panels 13b. Both coupling rings 12, 13 can be designed as plate components and can thus be produced without cutting. In the idler gear 3, in the area of the panels 12b, 13b, pockets 14 are formed, into which the panels 12b, 13b engage in a positive connection, thereby effecting a transmission of friction momentum from the synchronizer ring 11 to the idler gear 3 for the purpose of balancing the speed. The ends of the panels 12b, 13b are supported on a rocker 15, which is equipped at its rear with a pivot point 15a designed as a hemisphere, which is held within a spherical indentation 16 in the idler gear 3. This differentiated support of the two coupling rings 12, 13 allows them to shift axially relative to one another, enabling an even abutment between the conical surfaces of the synchronizer ring 11 and the conical surfaces of the two coupling rings 12, 13.

In the through openings 8, locking elements 17 designed as sliders are positively inserted, and are held in place, for example, via round springs 18. The locking elements 17 have locking surfaces 17a, 17b that are tapered in the direction of the through opening 8 and form an angle that is opposite a longitudinal axis 2a of the transmission shaft 2. The locking pin 9 has a taper that corresponds to the locking surfaces 17a, 17b, in which the locking element 17 comes to rest. For information on the functioning of a locking-pin synchronizer, please refer to the technical literature cited at the beginning (G. Lechner, Motor Vehicle Transmissions), especially to pages 258, 259.

In the embodiment shown here, the conventional synchronizer ring 10 is shown on the right side of the drawing and the synchronizer ring 11 with a double cone, according to the invention, is shown on the left side of the drawing. Due to the lower shifting force, the double cone is especially advantageous for a low gear while the synchronizer ring 10 with a single cone is intended for the higher gear. However, it is also possible for both synchronizer rings 10, 11 to be designed with a double cone, according to the invention, corresponding coupling rings, and a rocker.

| Reference numerals | |
|---|---|
| 1 | synchronizer |
| 2 | transmission shaft |
| 2a | longitudinal axis |
| 3 | idler gear |
| 3a | inner gearing |
| 4 | idler gear |
| 4a | inner gearing |
| 4b | outer cone |
| 5 | synchronizer sleeve |
| 5a | outer gearing |
| 5b | out gearing |
| 6 | shifting flange |
| 7 | shifting element (slider) |
| 8 | through opening |
| 9 | locking pin |
| 10 | synchronizer ring |
| 10a | inner cone |
| 11 | synchronizer ring |
| 11a | outer cone |
| 11b | inner cone |

| -continued | |
|---|---|
| Reference numerals | |
| 12 | outer coupling ring |
| 12a | matching cone |
| 12b | panels |
| 13 | inner coupling ring |
| 13a | matching cone |
| 13b | panels |
| 14 | pocket |
| 15 | rocker |
| 15a | pivot point |
| 16 | spherical indentation |
| 17 | locking element |
| 17a | locking surface |
| 17b | locking surface |
| 18 | round spring |

The invention claimed is:

1. A synchronizer (1) for a manual transmission with first and second idler gears (3, 4) rotatably mounted on a transmission shaft (2); a synchronizer sleeve (5) is non-rotatably mounted on the transmission shaft (2) such that the synchronizer sleeve (5) being axially shiftable, the synchronizer sleeve (5) being releasably connectable to one of the first and the second idler gears (3, 4), via a toothed engagement, and the synchronizer sleeve (5) comprising a shifting flange (6) having openings (8) arranged about a periphery thereof, and first and second synchronizer rings (10, 11) which are spaced apart from one another by locking pins (9) distributed around a periphery of the shifting flange (6) and inserted through the openings (8):

wherein at least one of the first and the second synchronizer rings (11) has a double cone;

the double cone (11a, 11b) of the at least one of the first and the second synchronizer rings (11) is positionable in non-positive contact simultaneously between an outer coupling ring (12) that has an inner cone (12a) and an inner coupling ring (13) that has an outer cone (13a); and the inner and the outer coupling rings (12, 13) are both positively connected to a rocker which pivotally supports the inner and the outer coupling rings (12, 13) relative to the adjacent idler gear (3).

2. The synchronizer (1) according to claim 1, wherein an outer cone (11a) of the double cone has a first taper angle (α) and an inner cone (11b) of the double cone has a second taper angle (β), and the first and the second taper angles (α, β) are oriented opposite one another and are substantially equal in size.

3. The synchronizer (1) according to claim 1, wherein the inner and the outer coupling rings (12, 13) each have panels (12b, 13b) arranged around a periphery thereof which engage in positive contact with pockets (14) in the first idler gear (3).

4. The synchronizer (1) according to claim 1, wherein the inner and the outer coupling rings (12, 13) is axially supported on the idler gear (3) by a rocker (15).

5. The synchronizer (1) according to claim 1, wherein locking elements (17), with tapered locking surfaces (17a, 17b), are arranged in the openings (8) in the shifting flange (6), and the locking surfaces (17a, 17b) function together with tapered surfaces on the locking pins (9).

6. The synchronizer (1) according to claim 1, wherein the inner coupling ring (13) surround the transmission shaft (2) and is positioned between a radially inwardly facing surface of the double cone and the transmission shaft (2).

7. The synchronizer (1) according to claim 1, wherein the inner cone (12a) of the outer coupling ring (12) engages with a first surface of the double cone of the at least one of the first and the second synchronizer rings (11) and the outer cone (13a) of the inner coupling ring (13) engages with an opposite second surface of the double cone of the at least one of the first and the second synchronizer rings (11) and the first surface tapers in a first direction and the second surface tapers in an opposite direction.

8. A synchronizer (1) for a manual transmission having first and second idler gears (3, 4) rotatably mounted on a transmission shaft (2); a synchronizer sleeve (5) being non-rotatably mounted on the transmission shaft (2) such that the synchronizer sleeve (5) can shift axially, the synchronizer sleeve (5) being releasably connectable, via a toothed arrangement, to one of the first and the second idler gears (3, 4) and the synchronizer sleeve (5) comprising a shifting flange (6) having openings (8) arranged about a periphery thereof, first and second synchronizer rings (10, 11) are spaced apart from one another by locking pins (9) distributed around a periphery and extending through the openings (8);
   wherein at least one of the first and the second synchronizer rings (11) has a double cone;
   the double cone (11a, 11b) is positionable in non-positive contact simultaneously with an outer coupling ring (12) that has an inner cone (12a) and an inner coupling ring (13) that has an outer cone (13a);
   the inner and the outer coupling rings (12, 13) can be positively connected to and axially supported against the adjacent idler gear (3); and
   rockers (15) are arranged in pockets (14) in the first idler gear (3) and form a rocking frame between panels (12b, 13b) of the outer and the inner coupling rings (12, 13).

9. The synchronizer (1) according to claim 8, wherein each of the rockers (15) has a hemispherical pivot and a support point (15a) which is held in a hemispherical indentation (16) in the first idler gear (3).

10. A synchronizer (1) for an automobile manual transmission comprising a first idler gear (3) and a second idler gear (4) rotatably mounted on a transmission shaft (2), a synchronizer sleeve (5) being non-rotatably mounted on the transmission shaft (2) and axially slidable along the transmission shaft for coupling to one of the first and the second idler gears (3, 4) via a toothed engagement, a shifting flange (6) having openings (8) distributed around a periphery of the shifting flange (6), a first synchronizer ring (10) and a second synchronizer ring (11) are separated from one another by locking pins (9) distributed around the periphery and inserted through the openings (8);
   at least one of the first and the second synchronizer rings (11) has a double cone, and the double cone (11a, 11b) is placed in non-positive contact simultaneously between an outer coupling ring (12) that has an inwardly facing cone surface (12a) and an inner coupling ring (13) that has an outwardly facing cone surface (13a); and
   the inner and the outer coupling rings (12, 13) are both positively connected to a rocker which pivotally supports the inner and the outer coupling rings (12, 13) relative to the adjacent idler gear (3).

11. The synchronizer (1) according to claim 10, wherein the inner coupling ring (13) surround the transmission shaft (2) and is positioned between a radially inwardly facing surface of the double cone and the transmission shaft (2).

12. The synchronizer (1) according to claim 10, wherein the inwardly facing cone surface (12a) of the outer coupling ring (12) engages with a first surface of the double cone of the at least one of the first and the second synchronizer rings (11) and the outwardly facing cone surface (13a) of the inner coupling ring (13) engages with an opposite second surface of the double cone of the at least one of the first and the second synchronizer rings (11) and the first surface tapers in a first direction and the second surface tapers in an opposite direction.

\* \* \* \* \*